United States Patent [19]
Rudle et al.

[11] 3,759,226
[45] Sept. 18, 1973

[54] PROCESS FOR MILKING ANIMALS AND APPARATUS FOR USE THEREWITH

[75] Inventors: August Rudle, Stuttgart-Bad Cannstatt; Kurt Striebel, Endingen, Wurtt, both of Germany

[73] Assignee: Bizerba-Werke Wilhelm Kraut KG, Wilhelm Kraut-Strasse, Germany

[22] Filed: Nov. 16, 1971

[21] Appl. No.: 199,146

[30] Foreign Application Priority Data
Nov. 20, 1970  Germany.................. P 20 57 100.0

[52] U.S. Cl............................ 119/14.36, 119/14.55
[51] Int. Cl. ............................................. A01j 05/16
[58] Field of Search...................... 119/14.36, 14.39, 119/14.4, 14.41, 14.37, 14.38

[56] References Cited
UNITED STATES PATENTS
1,195,997  8/1916  Leitch......................... 119/14.36 X
2,086,678  7/1937  Plint et al. ...................... 119/14.41
784,780  3/1905  Burrell............................. 119/14.36
2,039,421  5/1936  Jansson........................ 119/14.41 X
2,832,314  4/1958  Cyphers.......................... 119/14.38

FOREIGN PATENTS OR APPLICATIONS
1,482,309  6/1969  Germany........................ 119/14.38

Primary Examiner—Louis G. Mancene
Assistant Examiner—James H. Czerwonky
Attorney—Christen & Sabol

[57] ABSTRACT

A process for milking animals by machine consists in relieving the normal vacuum maintained in the milk line of the teat cup only during the time when the pressure in the massaging line has already been initiated and restoring the vacuum in the milk line before a vacuum is restored in the massaging line. This is accomplished by displacing the separate valving recesses of the sliding valve of a pulsator to regulate the timing of the connections between the teat cup and the pressure and vacuum sources.

13 Claims, 4 Drawing Figures

PATENTED SEP 18 1973 3,759,226

PROCESS FOR MILKING ANIMALS AND APPARATUS FOR USE THEREWITH

This invention relates to a process and apparatus for milking animals with the use of at least one teat cup connected with the teats of the animal by way of an elastic diaphragm, which cup is connected with a pulsator producing a periodic vacuum and excess pressure via a milk line and a massaging line.

In the case of known processes of this type, as disclosed in German utility Pat. No. 1 997 538, the connection of the milk line with the atmosphere is accomplished precisely synchronously with the introduction of excess pressure in the massaging line. Likewise, precisely synchronously with reference to each other, the massaging and milk lines again are connected with the vacuum source in the case of the known process. It has turned out that this control of the pressure in the massaging and milk lines is disadvantageous from several points of view. Apart from the fact that the pressure in the massaging line at the same time holds the teat cup tightly on the udder of the animal that is to be milked, the pressure in this line, as its name implies, also serves for the massaging of the teat, which is of decisive importance to achieve as natural a milking process as possible and, above all, to avoid diseases of the udder. Thus, the temporal control of the pressure in this line is of decisive importance in regard to the pressure conditions prevailing in the milk line.

The object of the invention proposes a milking process in which the pressures in the massaging and milk lines connected with the teat of the animal that is to be milked are coordinated with one another temporally in such a way that, for one thing, the teat cup is held securely on the udder and, for another thing, a nearly natural milking process can be achieved, thereby avoiding diseases of the udder.

According to the invention, this object is achieved by the pressure in the massaging line being built up before the reduction of the vacuum begins in the milk line and by building it up again only when a maximum vacuum has been reached in the milk line.

An apparatus to carry out this process is distinguished by the fact that the milk line and the massaging line are acted upon alternately with vacuum, atmospheric or pressure of compressed air by separate control recesses of a control slide displaced spatially with reference to one another.

The subsequent description of a preferred embodiment of the invention serves in connection with the attached drawings for the purpose of further explanation.

Figure 1:
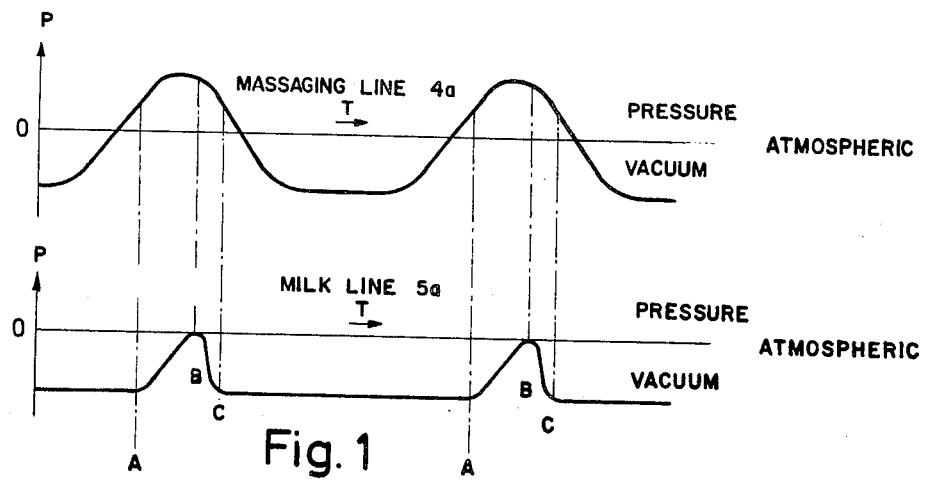
FIG. 1 is a diagram showing the pressure changes in the massaging and milk lines in the operation of a milking machine according to the process of the invention.

The changes of pressure in the massaging and milk lines during execution of the process according to the invention becomes clear from FIG. 1 wherein the vertical coordinates represent pressure, P, and the horizontal coordinates indicate time, T. The upper curve shows the changes of the pressure in the massaging line, the lower curve the changes of the pressure in the milk line. The horizontal base line, indicated by 0 represents atmospheric pressure; values below the line are subatmospheric degrees of vacuum, while values above the base indicate relative changes in compressed air pressure. By comparing the upper with the lower curve, it can be recognized that the essential characteristic of the process according to the invention consists in that the pressure in the massaging line (upper curve) is already built up before the reduction of the vacuum in the milk line begins. On the other hand, the pressure in the massaging line is maintained until a maximum vacuum is again achieved in the milk line.

In the case of a milking process taking place in the rhythm of the pressure changes according to FIG. 1, in experiments with live animals no diseases of the udder occurred and the output of milk of the experimental animals over an extended period of time did not decline, but, to the contrary, their output was even higher than traditional machine or manual milking processes.

Figure 2:
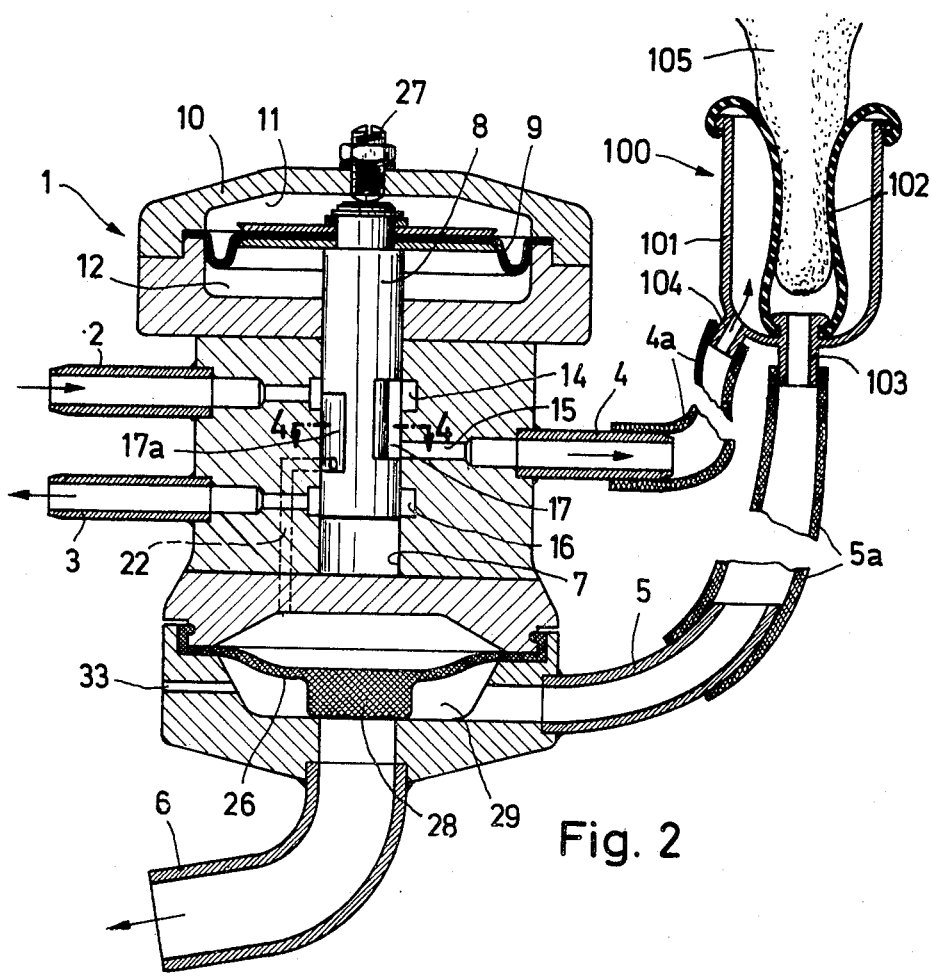
FIG. 2 shows a sectional view of an apparatus to carry out the process according to the invention in a first position.
Figure 3:
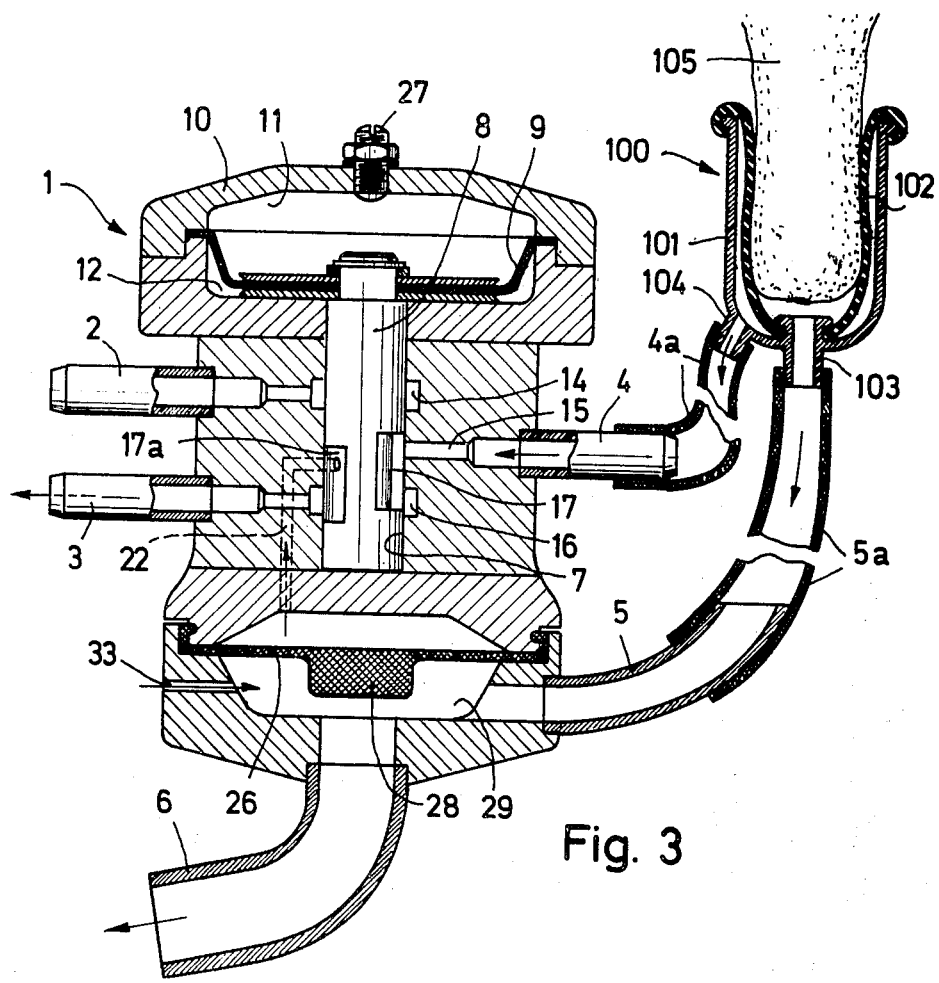
FIG. 3 shows the device of FIG. 2 in another position.
Figure 4:
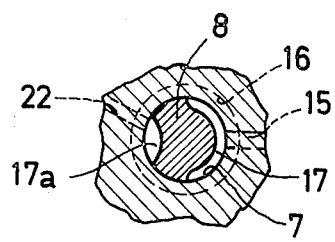
FIG. 4 is a sectional view along line 4—4 in FIG. 2.

In FIGS. 2–4 an apparatus is shown for carrying out the process according to the pressure cycles FIG. 1. On the housing 1 of a milking machine pulsator, composed of several elements, a number of tube nipples 2, 3, 4, 5 and 6 are disposed. The tube nipple 2 is constantly connected with a source of compressed air (not shown) during operation of the pulsator, while tube nipple 3 is constantly attached to a vacuum line (likewise not shown). The two tube nipples 4 and 5 are connected with the tube lines 4a and 5b, which lead to a teat cup 100 connected with the udder of the animal that is to be milked. Line 4a is the "massaging line" while line 5a is the "milk line".

The teat cup 100 consists of a cup-shaped housing 101 in which a hose-shaped elastic diaphragm 102 made of rubber, etc., is disposed. Diaphragm 102 at its upper edge is connected tightly with the opening of teat cup 101 and at its lower edge it is likewise tightly connected with a tube nipple 103 projecting into the cup, with which the hose line 5a (milk line) is connected at the outside of housing 101. Another tube nipple 104 provided on cup housing 101, which leads into the annular space between the inside wall of the cup and the outside wall of diaphragm 102, is connected with tube line 4a (massaging line). A teat 105 of the udder of the animal that is to be milked is introduced into the inside of the elastic diaphragm 102. Diaphragm 102 holds the teat cup 100 on teat 105.

The milk drawn from teat 105 flows via nipple 103, milk line 5a and tube nipple 5 into a milk collecting space 29 provided in housing 1, and from there via tube nipple 6 and a milk collecting line, not shown in the drawing, into a suitable closed container which is continuously maintained under a vacuum. Thus, there is also a constant vacuum in the tube nipple 6. The milk collecting chamber 29 furthermore is connected with the atmosphere via a restrictor 33 (shown as a narrow bore). The restrictor is dimensioned in such a way that, despite air flowing in through it, the vacuum introduced via nipple 6 prevails in the milk collecting chamber 29.

In housing 1 of the pulsator, a control slide 8 is reciprocally movable in a central bore 7. At its upper end, control slide 8 is connected with a flexible diaphragm 9, which subdivides a space in the upper part of the housing, which is closed by a lid 10, into two chambers 11 and 12. These two chambers are alternately acted upon in a known manner by excess or atmospheric pressure (compressed air or atmosphere), so that control slide 8 is alternately moved up and down by the flexing of diaphragm 9. In FIG. 2 the upper terminal position is shown and in FIG. 3 the lower terminal position of control slide 8 is shown.

Mechanisms for supplying alternating pressure and vacuum to the chambers 11 and 12 to reciprocate the slide 8 are shown diagrammatically in U.S. Pat. Nos. 3,125,067 and 3,150,637.

In bore 7, receiving the control slide 8, two annular grooves 14 and 16 are provided, which are connected with tube nipples 2 and 3, respectively. Thus, in annular groove 14, excess pressure prevails and annular groove 16 is under vacuum. Moreover, a channel 15 communicates with bore 7 to connect with tube nipple 4 and thus via massaging line 4a with teat cup 100. Finally, there is in addition, shown as a broken line in FIGS. 2 and 3, a channel 22 provided, which, on the one hand, likewise connects with the wall of the bore 7 and, on the other hand, communicates with the collecting chamber 29 above the diaphragm 26.

In the control slide there are two control recesses 17 and 17a displaced axially with reference to one another and with relatively sharp upper and lower control edges, the geometrical shape of which can be seen particularly from the cross sectional view of FIG. 4. The relative arrangement of control recesses 17 and 17a with reference to annular grooves 14 and 16 and to the mouth of channels 15 and 22 becomes clear from FIGS. 2 and 3.

An elastic diaphragm 26 is clamped in the milk collecting chamber 29 of the pulsator, to which an elastic valve body 28 is attached. The valve body 28 serves to periodically close the mouth of the milk collecting line leading into the milk collecting chamber 29, which line is attached to tube nipple 6.

The apparatus according to the invention which has been described thus far operates as follows during the milking process: Control slide 8 is driven reciprocatingly by diaphragm 9 controlled by compressed air alternatively introduced into the respective chambers 11 and 12. In its upper terminal position (FIG. 2), the control recess 17 connects annular groove 14, acted upon by compressed air through tube nipple 2, and channel 15 with the tube nipple 4, so that the annular space between cup housing 101 and diaphragm 102 likewise is acted upon by pressure via hose line 4a. Diaphragm 102 thus is pressed against the teat. In the position of control slide 8 shown in FIG. 2 furthermore, annular groove 14 having excess pressure is connected via control recess 17a with channel 22, so that diaphragm 26 also is acted upon by excess pressure and valve body 28 is pressed onto the mouth of tube nipple 6 and closes it tightly. Thus atmospheric pressure reaches the milk collecting chamber 29 via bore 33 acting as a restrictor and from there via hose line 5a to the teat 105. In this position, therefore, atmospheric pressure prevails inside the diaphragm 102 facing the teat, whereas the diaphragm on its outside is acted upon by excess pressure.

In the lower terminal position of control slide 8, shown in FIG. 3, annular groove 14 carrying excess pressure is completely closed. Control recess 17 now connects the annular groove 16, connected by tube nipple 3 to the vacuum source, via channel 15 with the tube nipple 4, so that the massaging line 4a and thus the annular space in the teat cup outside diaphragm 102 is acted upon by a vacuum. The control recess 17a in this position of control slide 8 also connects the vacuum supplying annular groove 16 with channel 22, so that vacuum likewise will prevail above diaphragm 26 and the elastic force of diaphragm 26 will lift valve body 28 from the mouth of tube nipple 6. Thus, a vacuum again prevails in the milk collecting chamber 29 which vacuum is also supplied from the milk collecting line connected with hose nipple 6, which can be nullified by atmospheric air flowing in slowly through constricted bore 33. The underpressure or vacuum are transmitted from milk collecting chamber 29 to milk line 5a and thus to teat 105.

During upward travel of slide 8 (from the FIG. 3 position to the FIG. 2 position), the upper end of recess 17 clears the lower margin of groove 14 slightly before the upper end of recess 17a clears the lower margin of groove 14. In the intervals of time between the successive clearances of the two recesses, pressure has begun to increase on the exterior of diaphragm 102 so that when recess 17a clears the lower margin of groove 14, the relative pressure conditions in the massage line (slight pressure above atmospheric) and the milk line (initiation of reduction of vacuum) are shown by the vertical dotted line A in FIG. 1.

On the other hand, when the slide 8 moves on the down stroke (from FIG. 2 to FIG. 3) the lower end of recess 17a clears the upper margin of groove 16, and is in communication therewith, for an increment of time during which the upper end of recess 17 is still in communication with groove 14 while the lower end of recess 17 does not come into communication with groove 16; the pressure relationships during this movement are shown in FIG. 1, just to the left of dotted line B, while line B represents the point of time at which the recess 17a establishes communication with groove 16.

Continuing with further downward movement of slide 8, it will be seen that the lower end of recess 17 will not come into communication with groove 16 and the upper end of this recess will not cut off communication with groove 14 until an increment of time after recess 17a has previously established communication with groove 16. The pressure relationships during this period are indicated to the right of the dotted line C in FIG. 1.

Because of the mutual spatial displacement of the respective upper and lower limits of recesses 17 and 17a on control slide 8, the introduction of pressure into the massaging line 4a and of atmospheric pressure into the milk line 5a do not occur simultaneously. Rather, the massaging line 4a is acted upon by compressed air via control recess 17 before any atmospheric pressure is released by control recess 17a into the milk line 5a. Inversely, the pressure will be reduced and the vacuum built up in the massaging line 4a (through control recess 17) only when a maximum vacuum again prevails in milk line 5a due to the action of control recess 17a. Thus the apparatus shown in the drawing causes a division of the pressure and vacuum rhythm as prescribed by the process according to the invention.

It has been found furthermore that while carrying out an orderly milking process, two additional factors also should be noted: For one thing, the frequency of the control slide should be constant at a certain value while, for another thing, the relieving time (the time in which atmospheric pressure prevails in milk line 5a) should be at a certain constant ratio with reference to the total time of the cycle of operation.

The rates of pulses can be regulated relatively simply by adjustment of the quantity of air fed to the driving diaphragm 9.

The ratio of relieving time to the total time of the cycle can be determined with the help of an adjusting screw 27 provided in the cover 10 of housing 1. Assuming that control slide 8 executes a regular oscillating movement, it is possible to adjust with this screw the upper reversing point of control slide 8. As a result of that however, the duration at which the upper edge of control recess 17a covers up the annular groove 14 acted upon by excess pressure is changed, and thus the duration of the excess pressure or vacuum duration in the massaging line 4a is correspondingly regulated.

Other modifications and improvements may be made which would come within the scope of the annexed claims.

We claim:

1. Process for milking animals by the use of a milking machine employing a teat cup having a flexible diaphragm and a milk line, comprising the steps of continuously cyclically subjecting the exterior of the teat cup diaphragm to varying amounts of fluid pressure alternating between a predetermined vacuum and a predetermined pressure greater than atmospheric, continuously cyclically subjecting the teat cup milk line to varying amounts of fluid pressure alternating between a predetermined vacuum and a predetermined pressure no greater than atmospheric and initiating the application of pressure greater than atmospheric to the exterior of the diaphragm prior to reduction of vacuum in the milk line.

2. The process of claim 1, which includes the steps of subjecting the diaphragm to said predetermined pressure greater than atmospheric prior to subjecting the milk line to said reduction of vacuum during each cycle.

3. The process of claim 1, which includes the steps of completing the reduction of pressure applied to the diaphragm to atmospheric pressure in each cycle subsequent to the initiation of the reduction of pressure in the milk line from said second predetermined pressure in each cycle.

4. The process of claim 3, which includes the step of completing the reduction of pressure in the milk line to the predetermined vacuum prior to the reduction of pressure to the predetermined vacuum applied to the diaphragm.

5. Process for milking animals by the use of a milking machine which includes a teat cup having a flexible diaphragm and milk line, comprising the steps of cyclically subjecting the exterior of the diaphragm to fluid pressures varying between a predetermined minimum below atmospheric and a predetermined maximum above atmospheric cyclically subjecting the milk line to fluid pressures varying between atmospheric and a predetermined minimum below atmospheric, and maintaining said pressure for the diaphragm above atmospheric for a longer period of time than the period of time that the pressure in the milk line is above said predetermined minimum.

6. Process according to claim 5, wherein said pressure of fluid for the diaphragm and pressure in the milk line are respectively varied between said respective upper and lower limits and vice versa once during each cycle of operation and said cycles are conducted rhythmically.

7. Process according to claim 5, wherein said pressures for the diaphragm and milk line respectively are reduced from said respective upper limits to said respective lower limits once during each cycle of operation, and the reduction in pressure of fluid for the diaphragm is initiated prior to the reduction in pressure in the milk line.

8. Process according to claim 7, wherein the pressure in the milk line is reduced to said respective minimum pressure prior to the reduction to atmospheric pressure of fluid applied to the diaphragm.

9. In a milking machine system of the type which includes a teat cup having a flexible diaphragm therein, said teat cup having a first nipple communicating with the space inside the diaphragm for connection with a milk line and a second nipple communicating with the space between the exterior of the diaphragm and the teat cup, pulsator means including housing means provided with a plurality of openings to be connected respectively with a source of fluid under pressure, a source of fluid under vacuum and milk container means maintained under vacuum and also to be connected with said first and second nipples of the teat cup to cyclically regulate variations in pressure at said first nipple between the vacuum of the milk container and atmospheric pressure and to cyclically connect said second nipple alternatively with said sources of fluid under pressure and under vacuum respectively, pneumatically operable reciprocating valve means mounted in said housing, said valve means including separate control surfaces movable between a first and a second position and in said first position coacting with said openings in the housing to connect the first nipple in communication with the atmosphere and connect the second nipple with the opening in the housing in communication with the source of fluid under pressure, said control surfaces being movable to said second position to connect the first nipple with the opening in the housing in communication with the vacuum of the milk container and connect the second nipple with the opening in the housing in communication with the source of fluid under vacuum, said control surfaces being positioned with respect to said openings to connect said first nipple with the atmosphere only when the second nipple is connected with said source of fluid under pressure.

10. The invention defined in claim 9, wherein said control surfaces and openings are relatively positioned to connect said second nipple with said source of vacuum only when said first nipple is connected with the vacuum of the milk container.

11. The invention defined in claim 9, wherein said housing is provided with a longitudinally extending bore and the valve means includes piston means slidable in said bore, said openings comprise at least two axially spaced grooves provided in said bore, said grooves being respectively connected with said respective sources of fluid under pressure and under vacuum, said openings also including at least one channel communicating with the interior of the bore and connected with said means to regulate variations in pressure at said first nipple and a second channel communicating with the interior of the bore and connected with said second nipple, said control surfaces including a first recess provided in said piston means in continuous communication with said one channel only and positioned for alternative communication with each of said two grooves, a second recess provided in said piston means in continuous communication with the second channel only and positioned for alternative communication with each of said two grooves, the axial limits of the second control recess being positioned relative to the axial limits of the first recess to connect both said nipples with fluid under vacuum when the piston means is in a first position and to admit fluid under pressure to the second nipple prior to connecting the first nipple with the atmosphere when the piston means is moved in one direction toward said second position.

12. The invention defined in claim 11, wherein said axial limits of the first and second recesses are relatively axially positioned to initiate connection of the first nipple with fluid under vacuum prior to connecting the second nipple with fluid under vacuum when the piston means is moved from said second position toward the first position.

13. The invention defined in claim 11, wherein said means to regulate variations in pressure at said first nipple includes a hollow chamber divided by a flexible diaphragm means, the chamber on one side of the diaphragm being in communication with said first channel, the chamber on the other side of the diaphragm having an inlet opening connected with the first nipple, an outlet opening connected with the milk container, and a narrow bore communicating with the atmosphere, said diaphragm in the chamber including valve means to close and open said outlet in response to pressure differences on opposite sides of the diaphragm.

* * * * *